(No Model.)
C. H. DAVIDS.
VARIABLE CRANK.
No. 520,157.
2 Sheets—Sheet 1.
Patented May 22, 1894.
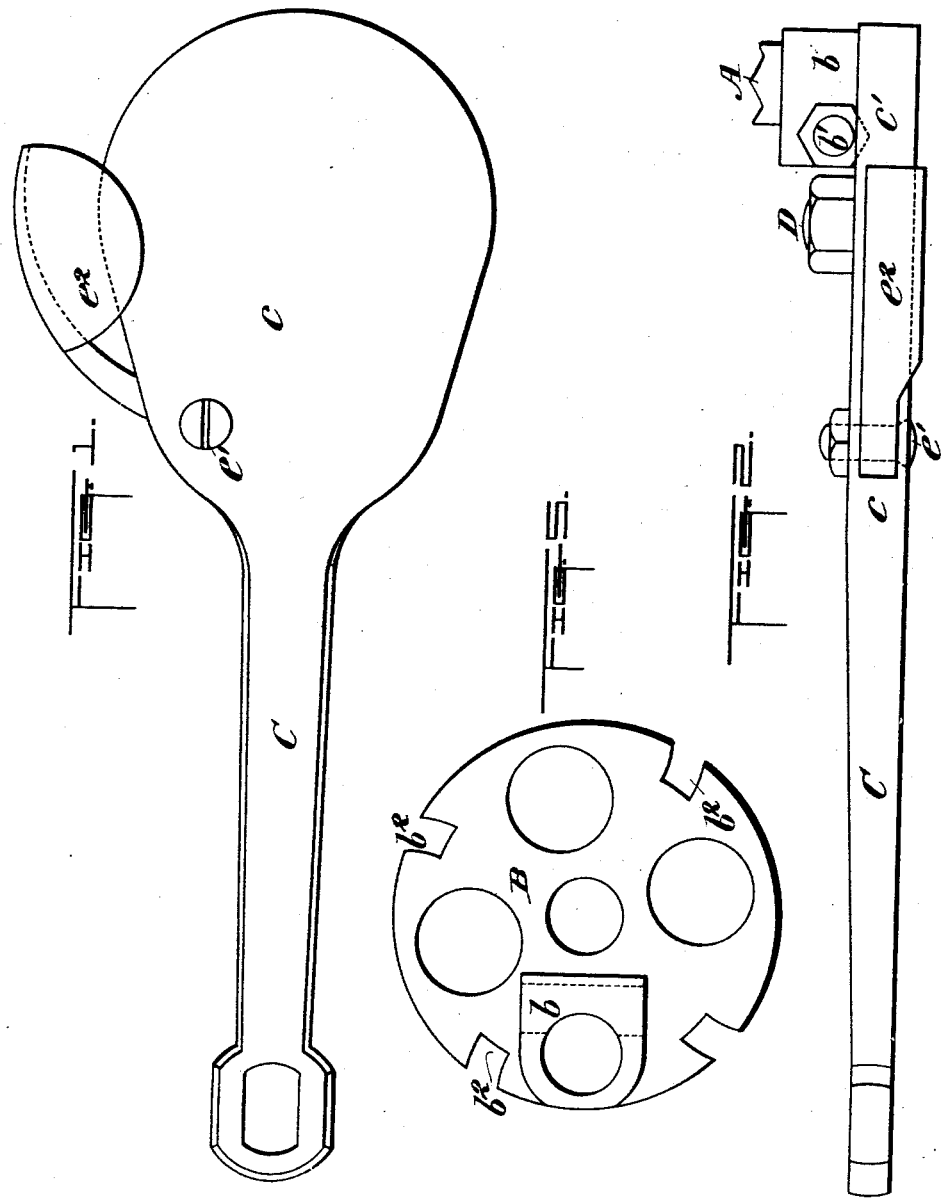
Witnesses.
Th. B. Seward
George Barry.
Inventor.
Charles H. Davids
by attorneys. Brown & Seward

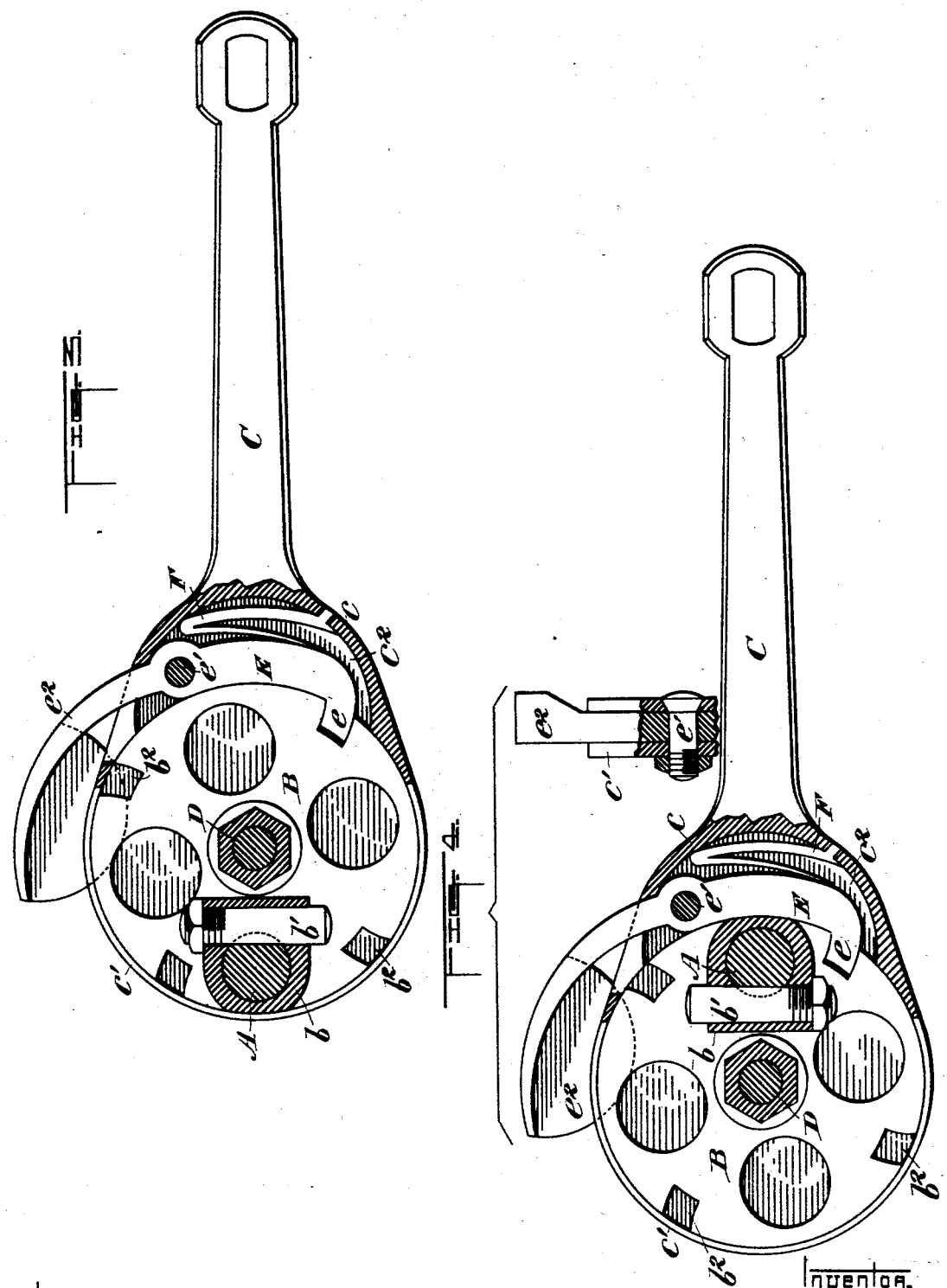

UNITED STATES PATENT OFFICE.

CHARLES H. DAVIDS, OF BROOKLYN, ASSIGNOR OF ONE-HALF TO JOHN STEWART, OF NEW YORK, N. Y.

VARIABLE CRANK.

SPECIFICATION forming part of Letters Patent No. 520,157, dated May 22, 1894.

Application filed November 1, 1893. Serial No. 489,682. (No model.)

*To all whom it may concern:*

Be it known that I, CHARLES H. DAVIDS, of Brooklyn, in the county of Kings and State of New York, have invented a new and useful Improvement in Variable Cranks, of which the following is a specification.

My invention relates to an improvement in variable cranks in which provision is made for changing the length of the crank by a rotary movement of it relatively to its support upon the axle. It is particularly well adapted to use in connection with the drive shaft of a velocipede for purposes of increasing the leverage in driving the velocipede up inclines and decreasing the leverage when on a level, thereby rendering it practicable to gear the velocipede to a higher rate than would otherwise be feasible.

For purposes of illustrating the practical use of the crank, I have shown it as applied to the drive shaft of a bicycle.

In the accompanying drawings, Figure 1 shows the crank as it appears in side elevation, looking toward the wheel. Fig. 2 is an edge or plan view of the same. Fig. 3 is an inside view in elevation, a portion of the rim being broken away to show the locking dog and the crank being located in its extended adjustment relative to the drive shaft. Fig. 4 is a similar view, showing the crank in its shortened adjustment relative to the drive shaft, and Fig. 5 is a face view in detail of the disk to which the crank is pivoted to change its position relative to the drive shaft.

A represents the drive shaft. To it a circular bearing B is keyed or otherwise secured, in the present instance I have shown it as keyed to the shaft by a key $b'$ which extends through a hub $b$ extending laterally from the disk B near the margin thereof, the bore for the reception of the drive shaft A extending through the disk B and the hub $b$. For purposes of saving weight and at the same time rendering the disk B sufficiently strong, I have made it of skeleton form and in its periphery I have located, at suitable intervals, notches $b^2$ for the reception of the nose of a locking dog carried by the crank. In the present instance I have shown the notches $b^2$ so located as to permit the crank to be adjusted on the side of the disk nearest the drive shaft, on the side of the disk farthest from the drive shaft and at points intermediate of these positions. It is obvious, however, that by increasing or diminishing the number of notches, the adjustments may be increased or diminished, as may be found expedient.

The shank of the crank is denoted by C and at its end, where it is connected with the disk B, it is widened and hollowed out to form a housing for and fitted, with an easy rotary movement, over the outer side and periphery of the disk B. Such widened portion of the crank, which covers the outer side of the disk B is denoted by $c$ and the rim which surrounds the periphery of the disk B is denoted by $c'$. The crank is pivotally secured at the center of the disk B, as for example by a pivotal stud bolt D, so that when released it may be swung around the disk B, the pivot D turning within the circular bearing disk B. The crank is also hollowed out, forming a chamber $c^2$ for the reception of the locking dog E, the nose $e$ of which is fitted to enter the notches $b^2$ in the disk. The dog E is pivoted, as at $e'$, within the chamber $c^2$ and is extended through to the outside of the chamber and provided with an operating pedal or hand piece $e^2$ which preferably projects over the rim of the crank into convenient position to be pressed upon by the heel of the rider to rock the dog out of engagement with the disk B. The nose of the dog is pressed normally toward the disk B by a spring F seated within the chamber $c^2$ between the back of the dog and the wall of the chamber.

In operation, when it is desired to change the crank from its extended adjustment— shown in Fig. 3—to its shortened adjustment— shown in Fig. 4—the dog E may be released from the disk B and the crank may then be swung around a half revolution, or, the disk B, keyed to the drive shaft, may be turned a half revolution while the crank is held against turning, either of which operations will serve to adjust the crank from its position on the disk B farthest from the drive shaft into its position thereon nearest to the drive shaft. In case it is desirable to adjust the crank to the position intermediate of its most extended and shortened positions, such adjustment may be effected by permitting the dog E to engage one of the notches intermediate of those which lock it in its extreme adjustments.

It is obvious that slight changes might be made in the construction and arrangement of the several parts without departing from the spirit and scope of my invention; hence I do not wish to limit myself strictly to the construction and arrangement herein set forth, but

What I claim is—

1. The combination with a velocipede crank, of a circular bearing on the axial line of which the crank is pivoted, the said bearing being provided with a plurality of notches along its periphery, a spring actuated locking dog pivoted to the crank with its operating arm accessible to the foot of the rider, the locking dog having an engagement with the notches on the said bearing to lock the crank positively to the bearing, and means for securing the bearing eccentrically to the drive shaft of a velocipede, substantially as set forth.

2. The combination with a crank provided with a recess, of a circular bearing adapted to seat within said recess, means for pivoting the crank to the bearing on the axial line of the latter, a spring actuated dog pivoted to the crank in position to engage the bearing, the said dog having an operating arm extended to the exterior of the crank and means for securing the bearing to a shaft, substantially as set forth.

CHAS. H. DAVIDS.

Witnesses:
FREDK. HAYNES,
IRENE B. DECKER.